(12) United States Patent
Thompson et al.

(10) Patent No.: US 8,757,956 B2
(45) Date of Patent: Jun. 24, 2014

(54) PROTECTION SYSTEM FOR ARTICULATED MACHINE

(75) Inventors: Joseph P. Thompson, Cedar Falls, IA (US); Jeffrey E. Jackson, Burlington, IA (US); Jared J. Thompson, Iowa City, IA (US); Wayne E. Bietz, Burlington, IA (US)

(73) Assignee: CNH Industrial America LLC, New Holland, PA (US)

(*) Notice: Subject to any disclaimer, the term of this patent is extended or adjusted under 35 U.S.C. 154(b) by 886 days.

(21) Appl. No.: 12/913,221

(22) Filed: Oct. 27, 2010

(65) Prior Publication Data
US 2012/0107079 A1 May 3, 2012

(51) Int. Cl.
*F16L 3/01* (2006.01)
*E02F 9/22* (2006.01)
*F16L 3/22* (2006.01)

(52) U.S. Cl.
CPC ............ *E02F 9/2275* (2013.01); *F16L 3/01* (2013.01); *F16L 3/221* (2013.01); *Y10S 414/131* (2013.01)
USPC ........... 414/680; 414/918; 414/694; 414/695; 414/696; 414/727; 138/110

(58) Field of Classification Search
CPC ............ E02F 9/2275; F16L 3/01; F16L 3/22; Y10S 414/131
USPC .......... 138/110; 414/680, 694, 695, 696, 727, 414/918
See application file for complete search history.

(56) References Cited

U.S. PATENT DOCUMENTS

| | | | |
|---|---|---|---|
| 3,082,890 A * | 3/1963 | Van Auwelaer et al. | 414/695 |
| 3,220,579 A * | 11/1965 | Pilch | 414/694 |
| 3,263,839 A | 8/1966 | Hauff | |
| 4,156,487 A * | 5/1979 | Dowd et al. | 414/694 |
| D254,548 S * | 3/1980 | Dowd et al. | D15/28 |
| 4,193,734 A | 3/1980 | Williams | |
| 4,557,448 A * | 12/1985 | Brown et al. | 248/75 |
| 4,941,275 A | 7/1990 | Beeley et al. | |
| 5,108,253 A | 4/1992 | Kobayashi et al. | |
| 5,232,330 A | 8/1993 | Rae et al. | |
| 5,806,313 A * | 9/1998 | Koshi et al. | 60/458 |
| 6,378,279 B1 * | 4/2002 | Smith et al. | 56/15.5 |
| 6,622,585 B1 | 9/2003 | Salomonsson et al. | |
| 6,684,537 B2 * | 2/2004 | Ichikawa et al. | 37/347 |
| 6,758,024 B1 * | 7/2004 | Mieger et al. | 52/839 |

(Continued)

FOREIGN PATENT DOCUMENTS

EP 0299083 A1 1/1989

*Primary Examiner* — Saul Rodriguez
*Assistant Examiner* — Brendan Tighe
(74) *Attorney, Agent, or Firm* — Patrick M. Sheldrake

(57) ABSTRACT

A system for protecting at least one tube extending between articulating joints of a work machine including a first guard configured to be at least partially inserted inside a first opening formed in a second portion that is pivotably connected to a first portion. A second guard is configured to be at least partially inserted inside a second opening formed in the third portion that is pivotably connected to the second portion and near the first portion. The first guard and the second guard form a protective passageway for a tube extending from the first portion to the third portion, the passageway substantially preventing contact between the at least one tube and surfaces of the second portion and the third portion in close proximity with the corresponding pivotable connections.

20 Claims, 8 Drawing Sheets

(56) References Cited

U.S. PATENT DOCUMENTS

| | | | |
|---|---|---|---|
| 6,872,043 B2* | 3/2005 | Yukawa et al. | 414/694 |
| 7,128,633 B2* | 10/2006 | Wilson | 446/425 |
| 7,682,124 B2* | 3/2010 | Miyazaki et al. | 414/694 |
| 7,735,248 B2* | 6/2010 | Sakada et al. | 37/466 |
| 2005/0047899 A1* | 3/2005 | Sugimoto | 414/724 |
| 2006/0254415 A1* | 11/2006 | Miyazaki et al. | 91/508 |

* cited by examiner

PROTECTION SYSTEM FOR ARTICULATED MACHINE

FIELD OF THE INVENTION

The present invention relates generally to the field of work machines. It relates more particularly to articulated work machines.

BACKGROUND OF THE INVENTION

Articulated work machines, such as a loader backhoe, also referred to as a backhoe, are commonly used on job sites. The articulations, such as the pivoting joint formed between the swing tower and the boom of the backhoe, is a source of abrasion for hoses and/or or tubes extending along the articulating or pivoting joint. Many known work machine constructions utilize numerous rigid clamping arrangements associated with the articulations, increasing costs associated with manufacturing, as well as maintenance, while failing to effectively reduce abrasion of the hoses/tubes.

Accordingly, it would be advantageous to reduce the abrasion for hoses and/or tubes associated with operation of articulated work machines.

SUMMARY OF THE INVENTION

The present invention relates to a work machine including a first portion, a second portion pivotably connected to the first portion and a third portion pivotably connected to the second portion and near the first portion. A first guard is configured to be at least partially inserted inside a first opening formed in the second portion. A second guard is configured to be at least partially inserted inside a second opening formed in the third portion. The first guard and the second guard include a protective passageway for at least one tube extending from the first portion to the third portion. The passageway substantially prevents contact between the at least one tube and surfaces of the second portion and the third portion in close proximity with the corresponding pivotable connections.

The present invention further relates to a system for protecting at least one tube extending between articulating joints of a work machine including a first guard configured to be at least partially inserted inside a first opening formed in a second portion that is pivotably connected to a first portion. A second guard is configured to be at least partially inserted inside a second opening formed in the third portion that is pivotably connected to the second portion and near the first portion. The first guard and the second guard include a protective passageway for a tube extending from the first portion to the third portion. The passageway substantially prevents contact between the at least one tube and surfaces of the second portion and the third portion in close proximity with the corresponding pivotable connections.

The present invention yet further relates to a work machine including a first portion, a second portion pivotably connected to the first portion and a third portion pivotably connected to the second portion and near the first portion. A first guard is configured to be at least partially inserted inside a first opening formed in the second portion. A second guard is configured to be at least partially inserted inside a second opening formed in the third portion. A retention device is positioned between the first portion and a second portion. The first guard and the second guard include a protective passageway for at least one tube extending from the first portion to the third portion. The passageway substantially prevents contact between the at least one tube and surfaces of the second portion and the third portion in close proximity with the corresponding pivotable connections, the retention device providing flexible retention of the at least one tube.

An advantage of the present invention is enhanced protection for hoses and/or tubes extending along articulations of work machines.

A further advantage of the present invention is reduced manufacturing and maintenance costs associated with a reduction in hose/tube abrasions associated with the operation of pork machines.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
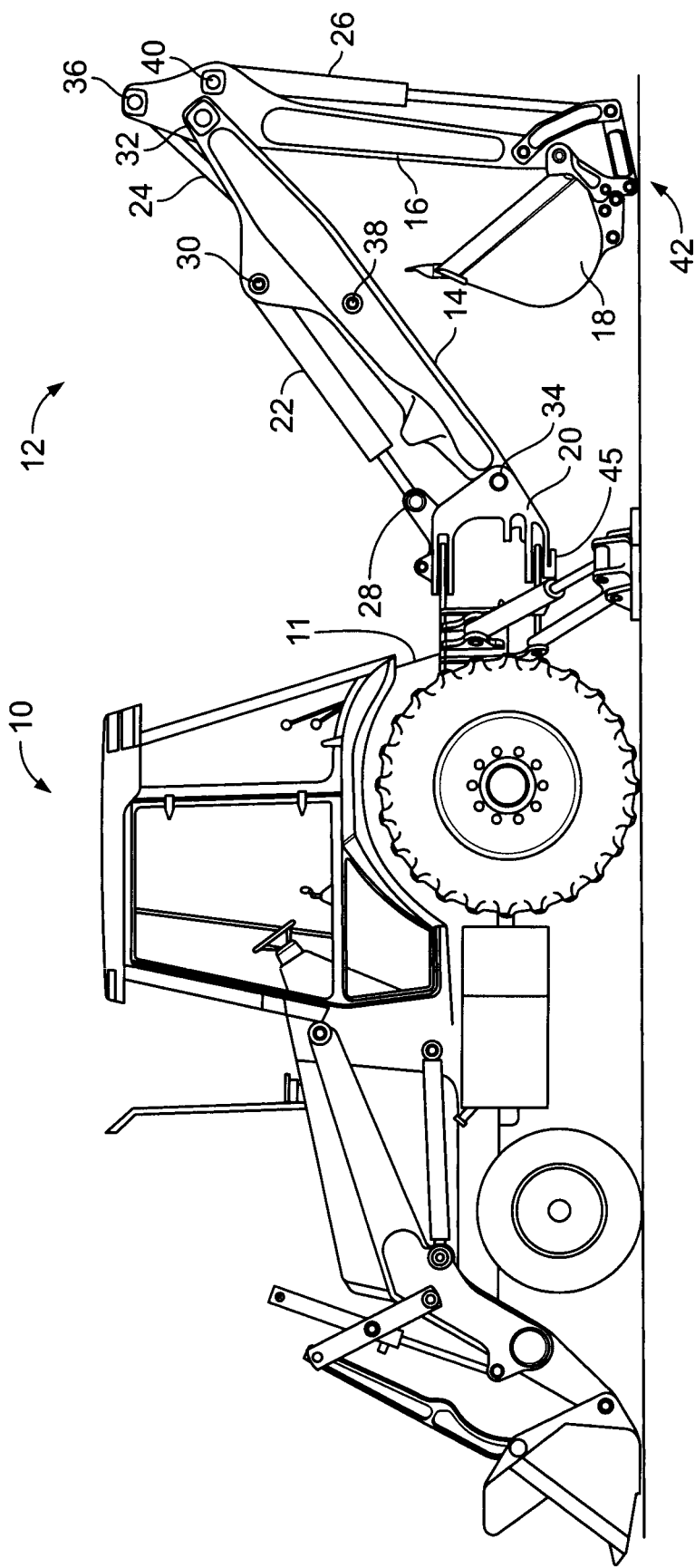
FIG. 1 is a side view of an embodiment of a work machine of the present invention.

Referring to the drawings for a description of an articulated earthworking machine 10, sometimes referred to as an excavator, that employs the present invention, FIG. 1 shows a third portion or boom 14 in a lowered position. Boom 14 pivots about a pivot joint 34 and coincident pivot axis of a second portion or swing frame or frame 20 and is controlled by extension/contraction of a fluid ram 22 connected between pivot joints 28, 30. Frame 20 pivots about a pivot joint 45 with respect to a first portion or base frame 11 of the machine. Similarly, an arm 16, often referred to as a dipper, pivots about pivot joint 32 of boom 14 and is controlled by extension/contraction of fluid ram 24 connected between pivot joints 36, 38. In addition, attachment or implement 18, such as a bucket, is pivotably connected to arm 16 and is controlled by extension/contraction of a fluid ram 26 connected between pivot joint 40 and interconnected linkages 42. A backhoe 12 comprises the combination of boom 14, arm 16, implement 18 and pivoting connections therebetween.

As used herein, the term articulated, as in articulated machine indicates that the machine includes articulations, articulating or pivotable or pivot joints or connections, which terms may be used interchangeably.

Figure 2:
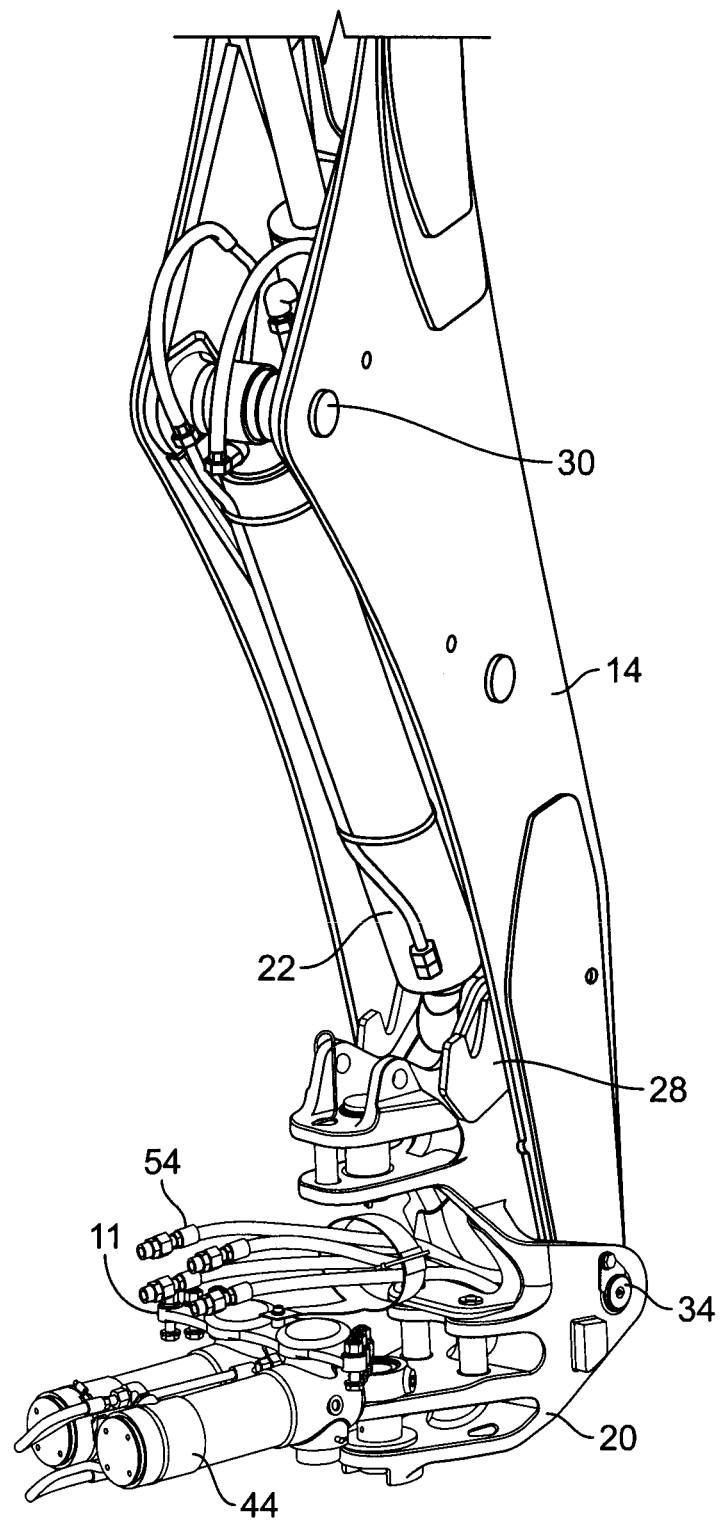
FIG. 2 is a partial, downward and rearward looking view of the boom of the work machine of the present invention.
Figure 3:
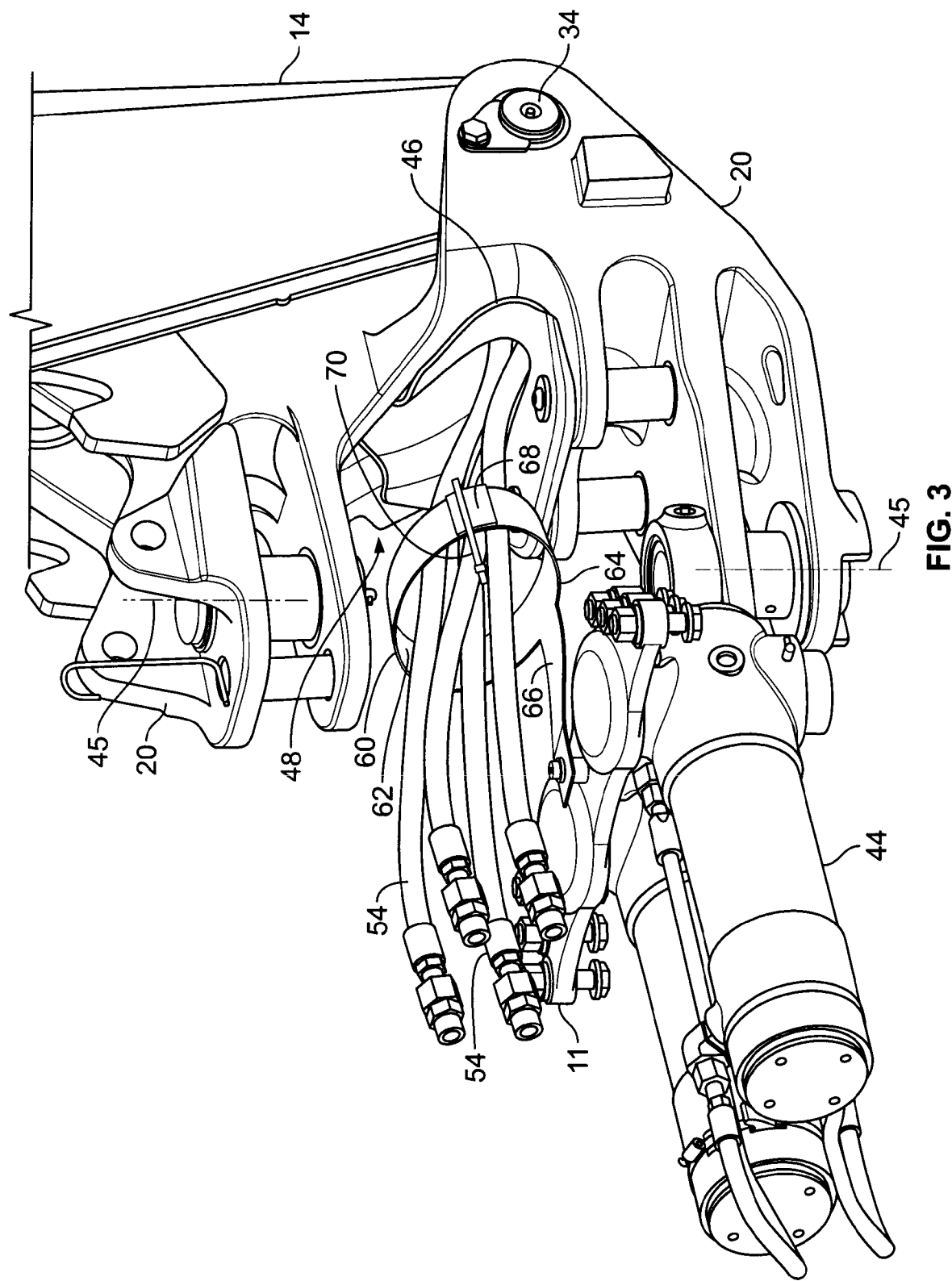
FIG. 3 is an enlarged, partial view of FIG. 2 of the present invention.

FIGS. 2-3 show a partial, downward and rearward looking view of third portion or boom 14 and second portion or swing frame 20 of work machine 10. Fluid rams 44 (shown in a disconnected position with respect to swing frame 20) which extend from first portion or base frame 11 urge swing frame 20 and boom 14 to rotate about pivot joint 45. Additionally, third portion or boom 14 pivots about a pivot joint 34 with respect to second portion or swing frame 20. Hoses or tubes 54 provide high pressure fluid to operate the fluid rams. The hoses or tubes 54 may be connected to first portion or base frame 11, extending first through a first opening 48 formed in swing frame 20, and then through a second opening 52 (see FIGS. 7-8) formed in third portion or boom 14. The openings 48, 52 both reduce the weight of the respective swing frame 20 and boom 14, but additionally provide a passageway for the tubes 54. The passageway helps protect the tubes from damage during operation of the machine, as well as minimizing a reduction of operator visibility that could otherwise result from the tubes 54 extending exterior of swing frame 20 and boom 14.

In close proximity to first opening 48 formed in second portion or swing frame 20 and positioned between the swing frame and the first portion or base frame 11, a retention device 60 comprises an adjustable strap 62 including a first segment 64 that surrounds tubes 54. First segment 64 may be adjustably secured to surround tubes 54 utilizing a buckle 68 and tie-wrap 72 both secure the buckle in position, as well as to secure a loose end of the first segment. Retention device 60 further includes a second segment 66 connected to first segment 64 that is configured for securing the retention device to the first portion or base frame 11. Retention device 60 permits a collective movable arrangement of tubes 54, as provided by second segment 66. Further, depending upon the magnitude of tension applied to first segment 64, retention device 60 also permits a non-aligned, independently movable arrangement of tubes 54 with respect to each other. In an alternate embodiment, second segment 66 may be secured to swing frame 20.

A first guard 46 is at least partially inserted inside of first opening 48 of swing frame 20. Similarly, a second guard 50 is at least partially inserted inside of second opening 52 (see FIGS. 7-8). Collectively, guards 46, 50 comprise enhanced protection, also referred to as a protective passageway, in that guards 46, 50 substantially prevent direct contact between tubes 54 and surfaces of swing frame 20 and boom 14 in close proximity with their corresponding pivotable connections. That is, guards 46, 50 not only cover the respective inner surfaces of swing frame 20 and boom 14 from direct contact with tubes 54, but the guards also extend sufficiently along the swing frame and boom so as also to cover portions of the respective inner surfaces of the swing frame and boom that would be considered in close proximity to the pivotable connections between the swing frame and boom. Stated another way, the first guard and the second guard cover a majority of surface area associated with the corresponding pivotable connections.

Figure 4:
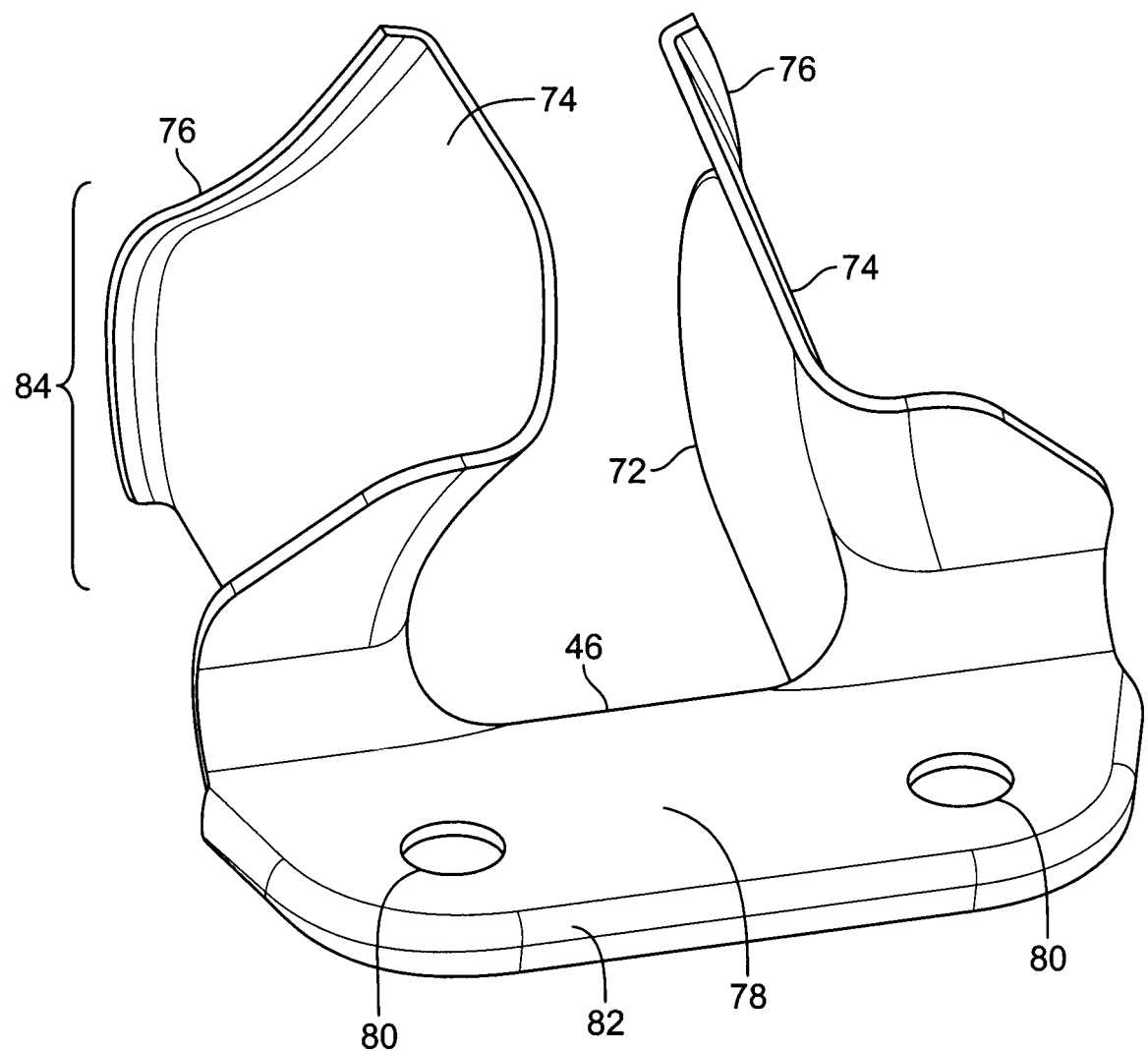
FIG. 4 is an upper perspective view of a first guard for use with a swing frame of the work machine of the present invention.
Figure 5:
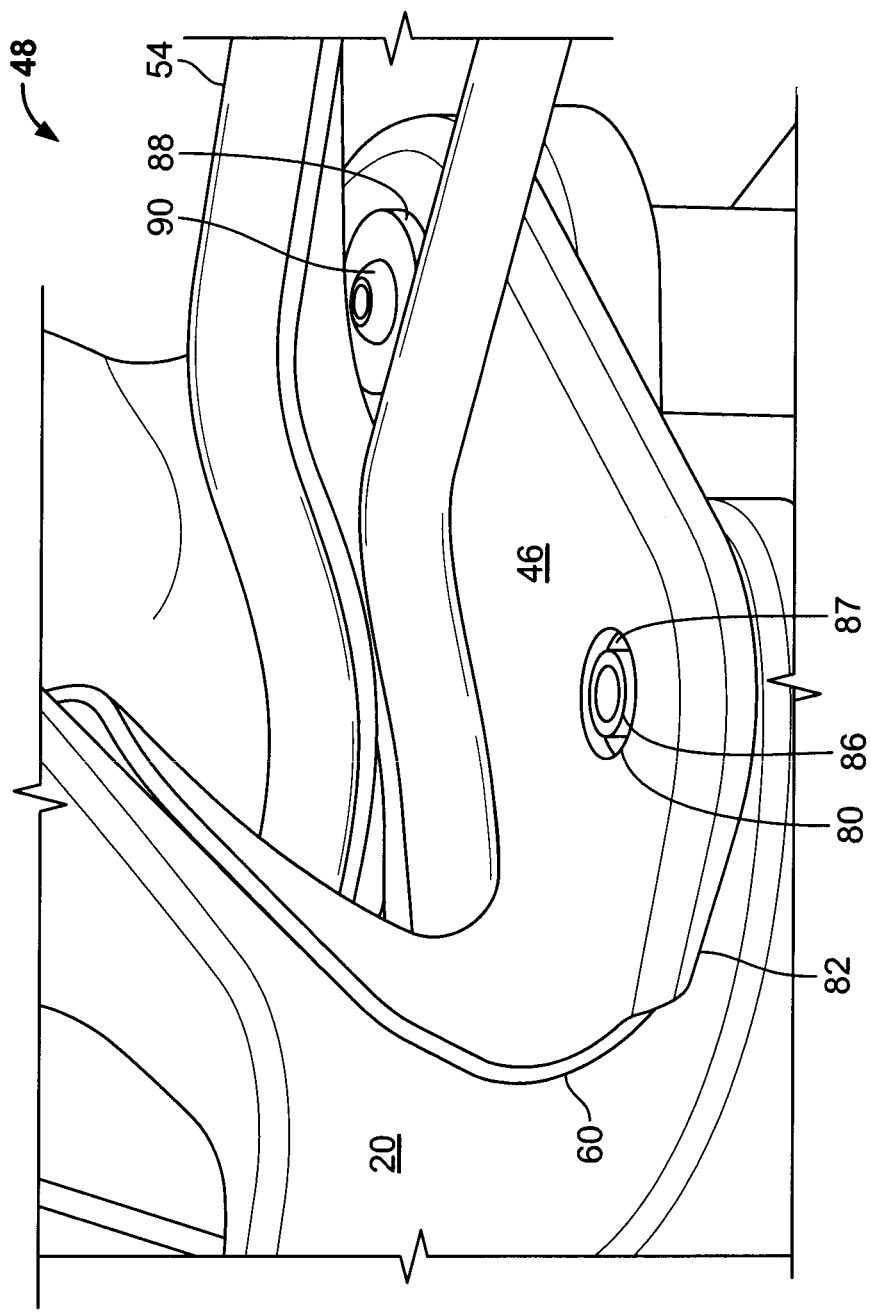
FIG. 5 is an enlarged, reverse perspective view of the first guard of FIG. 4 in an installed position in a work vehicle of the present invention.

FIGS. 4-5 show first guard 46 in both an uninstalled and installed condition, respectively. As further shown in FIG. 5, the first guard is installed in first opening 48 formed in second portion or swing frame 20. An exemplary embodiment of first guard 46 includes a base portion 78 including a pair of openings 80 formed therethrough to permit the first guard to be secured to the machine, such as by mechanical fasteners. However, in an alternate embodiment, the first guard may be configured for installation, such as by snap-fit or other construction, permitting the first guard to be directly secured to the inside surface of swing frame without requiring additional fasteners. Base portion 78 extends to an extension portion 84, terminating in a pair of opposed flanges 76. First guard 46 includes an inner surface 72 and an outer surface 74. In an installed position, outer surface 74 is placed in substantially conformal abutting contact with first opening 48. Extension portion 84 spans the length of first opening 48, with opposed flanges 76 extending over and around, i.e., covering, edges of first opening 48 of swing frame 20 facing away from base frame 11 (FIG. 1). As a result of first guard 46, tubes 54 extending through first opening 48 of swing frame 20 will be substantially prevented from directly contacting the surface of the first opening, as well as portions of the surface of swing frame 20 in close proximity to the pivot joint associated with the swing frame.

As further shown in FIG. 5, prior to installing first guard 46, an annular insert 86 having an outer diameter that is sufficiently less than the inner diameter of opening 80 so as to establish a gap 87 therebetween is positioned inside of opening 80. Additionally, annular insert 86 is at least of equal thickness compared to the region surrounding opening 80, such that washer 88 which is secured by fastener 90 does not compress and cause damage to first guard 46 during assembly. Moreover, by virtue of the construction of annular insert 86, during operation of the machine, first guard 46 is permitted a small degree of movement with respect to swing frame 20, thereby further reducing relative movement (and abrasion) between the inner surface 72 of first guard 46 and the outer surfaces of tubes 54. In an exemplary embodiment, first guard 46 is composed of a material, such as a plastic or polymeric or other suitable material, having a low coefficient of friction between the guard and tubes 54.

Figure 6:
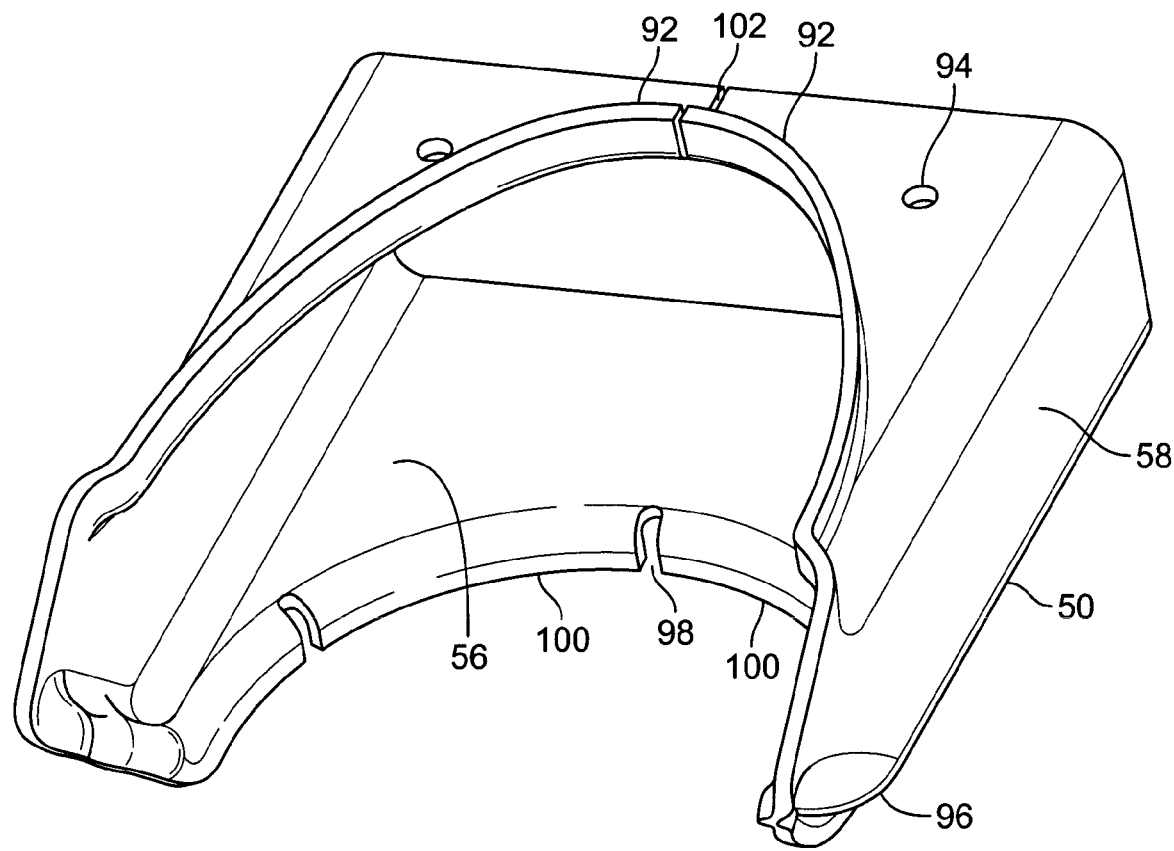
FIG. 6 is an upper perspective view of a second guard for use with a boom of the work machine of the present invention.
Figure 7:
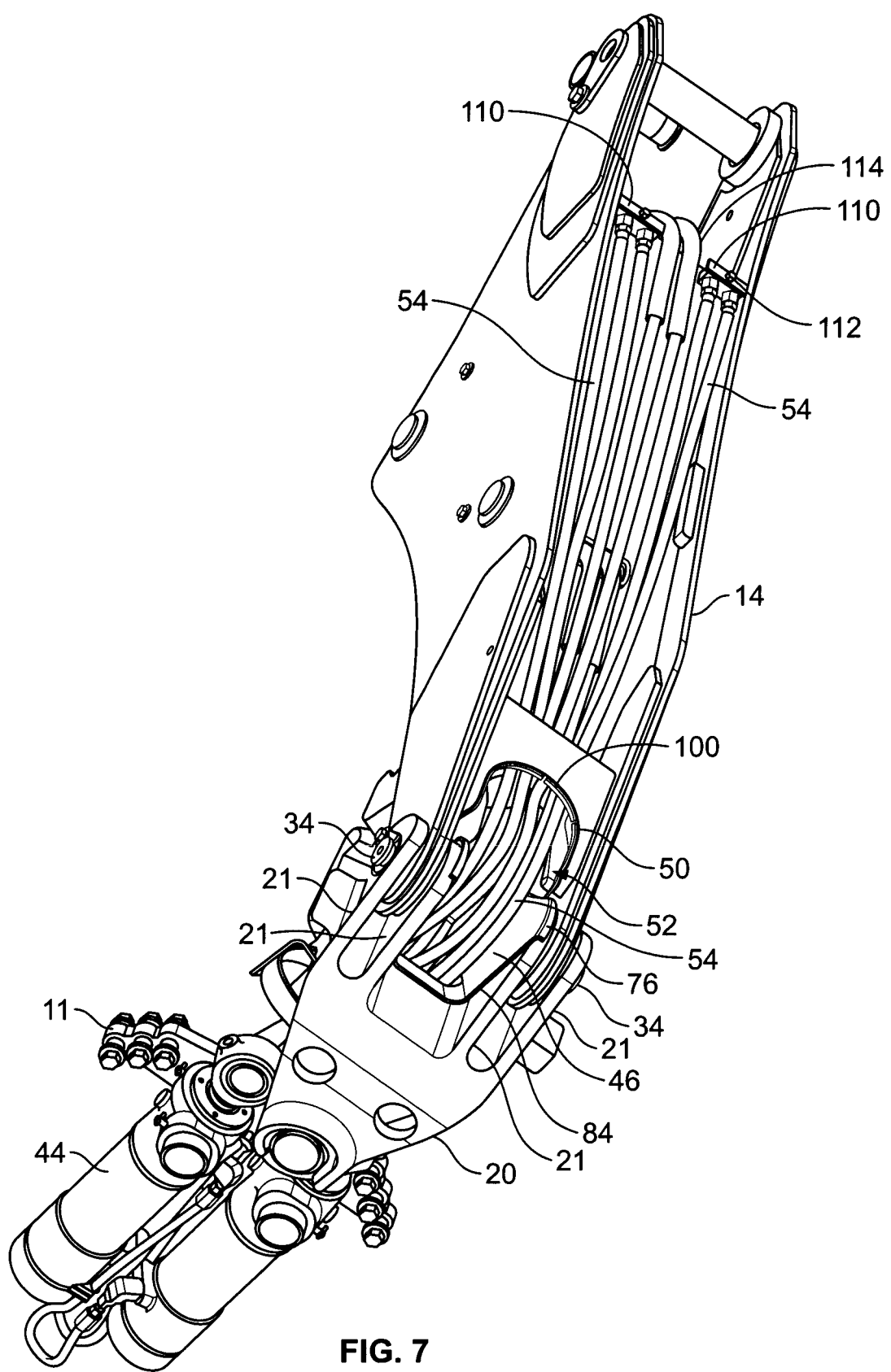
FIG. 7 is a upward and forward looking view of FIG. 2 of the present invention.
Figure 8:
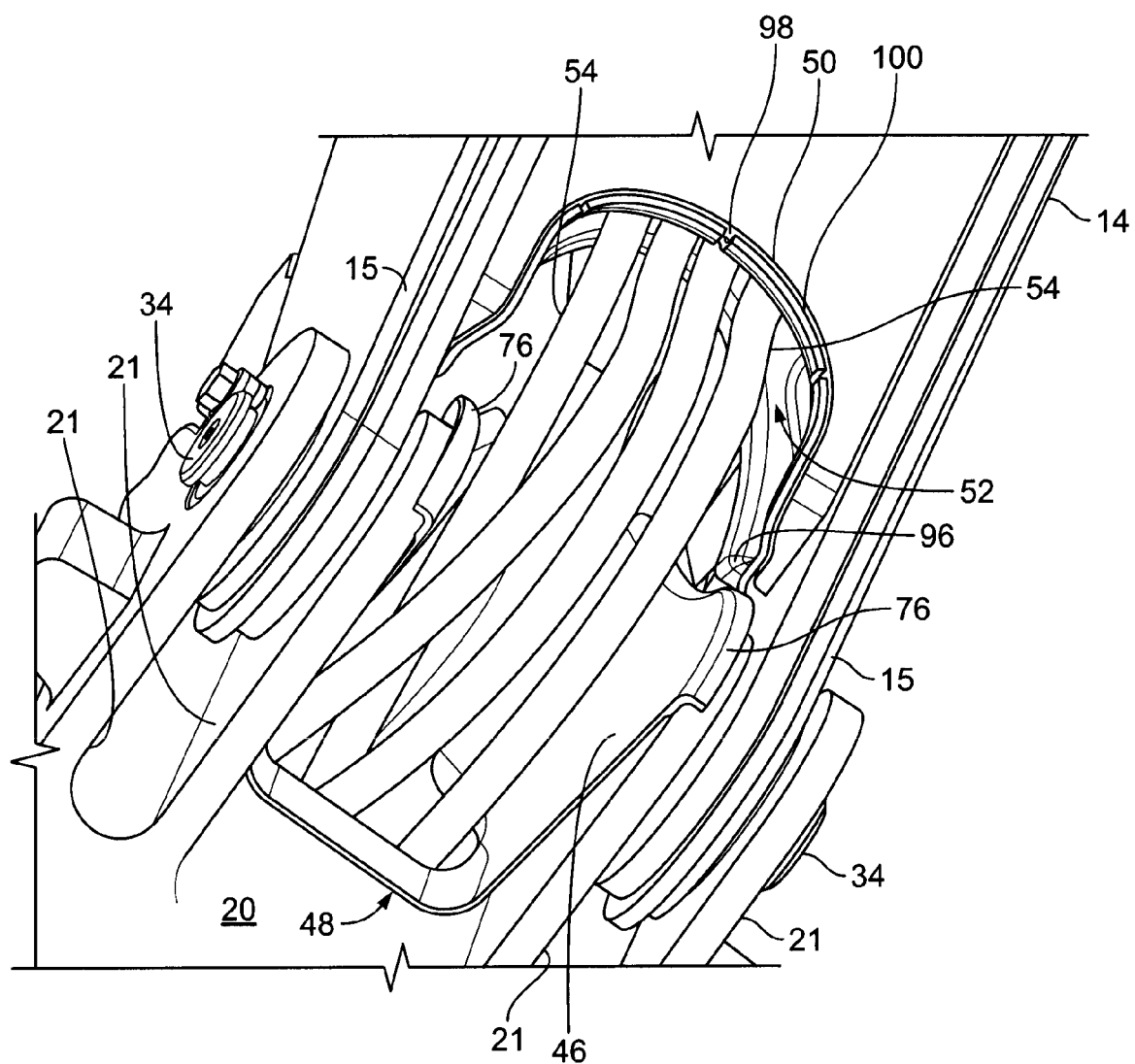
FIG. 8 is an enlarged, partial view of FIG. 7 of the present invention.

FIGS. 6-8 show second guard 50 in both an uninstalled and installed condition, respectively. As further shown in FIGS. 7-8, the second guard 50 is installed in second opening 52 formed in boom 14. An exemplary embodiment of second guard 50 includes optional openings 94 formed in the second guard to receive fasteners to secure the second guard to the boom. However in an alternate embodiment, the second guard may be configured such as by snap-fit or other construction, permitting the second guard to be directly secured to the inside surface of the boom without requiring additional fasteners. Second guard 50 includes an inner surface 56 and an outer surface 58 that extends to flanges 92, 100, including protruding portions 96. In an installed position, outer surface 58 is placed in substantially conformal abutting contact with second opening 52 with flanges 92, 100 substantially covering the end of the boom that forms pivot joint 34 with swing tower 20. As a result of second guard 50, tubes 54 extending through second opening 52 of boom 14 will be substantially prevented from directly contacting the surface of the second opening, as well as portions of the surface of boom 14 in close proximity to pivot joint 34 associated with the boom. Pivot joint 34 is formed by a pair of pinned connections defined between interconnected lobes 21 of swing tower 20 and lobe 15 of boom 14. Slot 102 permits relative movement of one portion of second guard 50 with respect to another portion, such as may be required for ease of insertion of second guard inside of the boom. In addition, slot 98 permits relative expansion/contraction along flange 100 over a broad range of temperatures, as well as permitting an amount of elastic deformation of second guard 50. Similar to first guard 46, second guard 50 is composed of a material, such as a plastic or polymeric or other suitable material, having a low coefficient of friction between the guard and tubes 54 in order to minimize potential abrasion therebetween.

Is to be understood that by utilizing the first and second guards, as well as the flexible retention device, not only is abrasion along the exterior surfaces of the tubes in close proximity of pivot joints reduced, for reasons previously discussed, manufacturing costs are also reduced. That is, instead of requiring the installation of multiple hose clamps at multiple locations that are adjacent to an articulating joint, known work machine constructions, such as a backhoe, typically utilize numerous additional sets of hose clamps secured to the boom. These additional sets of hose clamps result in increased hardware costs, as well as increased labor costs associated with installation of the clamps. In one embodiment of the present invention, not only is a single retention device utilized, such as retention device 60 positioned in close proximity with and between a first portion or base frame 11 and second portion or swing frame 20, but only uses a pair of smaller hose clamps 110 secured adjacent to an end of boom 14 opposite the swing frame, such as by fastener 112. In an alternate embodiment, a single hose clamp may be utilized. As further shown FIG. 7, one or more of hose is 54 may bypass the hose clamp 110, such as for hoses adjacent to the corresponding connection for a fluid ram, and not requiring additional fittings to retain the hose, such as the hose clamp. In such instances a protective coating 114 may be applied or slid over the end of the hose. However, in other embodiments, other arrangements may be used. In addition, by virtue of the reduction of hose clamps/retention devices, relative movement of the hoses may be permitted within the confines of the structure of the work vehicle member. In a further embodiment, the relative movement of the hoses may occur over substantially an entire length of a structural member of the work vehicle, such as a boom of the backhoe. For example, as further shown in FIG. 7, by virtue of the cutout formed in boom 14, hoses 54 extending the length of the boom are not restricted from relative movement within the boom, which relative movement does not cause undue abrasion to the surfaces of the hoses.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work machine comprising:
   a first portion;
   a second portion pivotably connected to the first portion;
   a third portion pivotably connected to the second portion and near the first portion;
   a first guard configured to be at least partially inserted inside a first opening formed in the second portion, the first opening in close proximity with the corresponding pivotable connection; and
   a second guard configured to be at least partially inserted inside a second opening formed in the third portion, the second opening in close proximity with the corresponding pivotable connection;
   wherein the first guard and the second guard form at least a portion of a protective passageway for at least one tube extending from the first portion to the third portion, the passageway substantially preventing contact between the at least one tube and surfaces of the second portion and the third portion in close proximity with the corresponding pivotable connections.

2. The work machine of claim 1, comprising a retention device positioned between the first portion and the second portion.

3. The work machine of claim 2, wherein the retention device provides flexible retention of the at least one tube within the retention device.

4. The work machine of claim 2, wherein the retention device permits a non-aligned, independently movable arrangement of the at least one tube.

5. The work machine of claim 4, wherein the retention device includes an adjustment strap having a first segment configured for surrounding the at least one tube and a second segment configured for securing the retention device to the first portion of the machine.

6. The work machine of claim 1, wherein at least one of the first guard and the second guard is secured to at least one of the corresponding second portion and third portion.

7. The work machine of claim 1, wherein at least one of the first guard and the second guard is secured to at least one of the corresponding second portion and third portion in a manner permitting relative movement between at least one of the first guard and the second portion, and the second guard and the third portion.

8. The work machine of claim 1, wherein the first guard and the second guard cover a majority of surface area associated with the corresponding pivotable connection between the second and third components, and wherein the work machine is an excavator or a backhoe.

9. The work machine of claim 8, wherein relative movement of the at least one tube occurs over substantially an entire length of a boom of the backhoe.

10. The work machine of claim 1, wherein the third portion is a boom and the second guard is located above the horizontal pivot between the second and third portions when the boom is in a raised position.

11. The work machine of claim 1, wherein the passageway for the at least one tube extends between at least two pivotal connectors forming the pivotal connection between the second and third portions.

12. The work machine of claim 1, wherein the third portion is a boom and a majority of the travel of the at least one tube within the boom is not restrained.

13. A system for protecting at least one tube extending between articulating joints of a work machine comprising:
    a first guard configured to be at least partially inserted inside a first opening formed in a second portion that is pivotably connected to a first portion,
    a second guard configured to be at least partially inserted inside a second opening formed in a third portion that is pivotably connected to the second portion and near the first portion; the first opening and second opening in close proximity with the corresponding pivotable connection;
    wherein the first guard and the second guard form at least a portion of a protective passageway for a tube extending from the first portion to the third portion, the passageway substantially preventing contact between the at least one tube and surfaces of the second portion and the third portion in close proximity with the corresponding pivotable connections.

14. The system of claim 13, comprising a retention device positioned between the first portion and the second portion, the retention device providing flexible retention of the at least one tube within the retention device.

15. The system of claim 14, wherein the retention device permits a non-aligned, independently movable arrangement of the at least one tube.

16. The system of claim 14, wherein the retention device includes an adjustment strap having a first segment configured for surrounding the at least one tube and a second segment configured for securing the retention device to the first portion of the machine.

17. The system of claim 13, wherein at least one of the first guard and the second guard is secured to at least one of the corresponding second portion and third portion in a manner permitting relative movement between at least one of the first guard and the second portion, and the second guard and the third portion.

18. The system of claim 13, wherein the first guard and the second guard cover a majority of surface area associated with the corresponding pivotable connection between the second and third components, and wherein the work machine is an excavator or a backhoe.

19. A work machine comprising:
   a first portion;
   a second portion pivotably connected to the first portion;
   a third portion pivotably connected to the second portion and near the first portion;
   a first guard configured to be at least partially inserted inside a first opening formed in the second portion, the first opening in close proximity with the corresponding pivotable connection; and
   a second guard configured to be at least partially inserted inside a second opening formed in the third portion, the second opening in close proximity with the corresponding pivotable connection;
   a retention device positioned between the first portion and a second portion;
   wherein the first guard and the second guard forming at least a portion of a protective passageway for at least one tube extending from the first portion to the third portion, the passageway substantially preventing contact between the at least one tube and surfaces of the second portion and the third portion in close proximity with the corresponding pivotable connections, the retention device providing flexible retention of the at least one tube.

20. The system of claim 19, wherein the first guard and the second guard cover a majority of surface area associated with at least the pivotable connection between the second and third portions, and wherein the work machine is an excavator or a backhoe.

* * * * *